United States Patent [19]

Kimura et al.

[11] 4,267,548
[45] May 12, 1981

[54] FORMAT-INFORMATION SYNTHESIZING SYSTEM

[75] Inventors: Tsutomu Kimura; Masahiro Ohnishi, both of Asaka, Japan

[73] Assignee: Fuji Photo Film Co., Ltd., Minami-ashigara, Japan

[21] Appl. No.: 971,408

[22] Filed: Dec. 20, 1978

[30] Foreign Application Priority Data

Dec. 23, 1977 [JP] Japan ............................ 52-155250

[51] Int. Cl.³ .................. G06K 9/00; B41B 13/00; G01D 15/04
[52] U.S. Cl. .................. 340/146.3 AH; 340/146.3 R; 340/709; 346/108; 354/5; 355/3R; 358/302
[58] Field of Search ............. 340/703, 709, 730, 791, 340/793, 724, 146.3 R, 146.3 AH; 346/76 L, 108; 354/4, 5; 355/3 R, 40, 43, 79; 358/302; 350/6.1, 285

[56] References Cited

U.S. PATENT DOCUMENTS

| | | | |
|---|---|---|---|
| 3,609,749 | 9/1971 | McClelland | 340/709 |
| 3,648,272 | 3/1972 | Schroder et al. | 340/709 |
| 3,701,999 | 10/1972 | Congleton et al. | 354/5 |
| 3,868,673 | 2/1975 | Mau, Jr. et al. | 340/709 |
| 4,028,695 | 6/1977 | Saich | 340/709 |
| 4,109,256 | 8/1978 | Ohnishi | 358/302 |
| 4,122,462 | 10/1978 | Hirayama et al. | 346/108 |

*Primary Examiner*—Leo H. Boudreau

[57] ABSTRACT

A format pattern carried on a format transparency is photoelectrically converted into an electric signal. The electric signal representing the format pattern is inputted into an "exclusive-or" circuit together with a character pattern signal representing output information of a computer. The output of the "exclusive-or" circuit controls an on-off modulator which modulates a laser beam for recording the output information of the computer. The modulated laser beam is deflected by a beam scanner to scan a photosensitive or heat sensitive film to record thereon the format pattern together with the computer output information.

2 Claims, 10 Drawing Figures

FIG.IA
FIG.IB
FIG.IC
FIG.ID
FIG.2
FIG.3
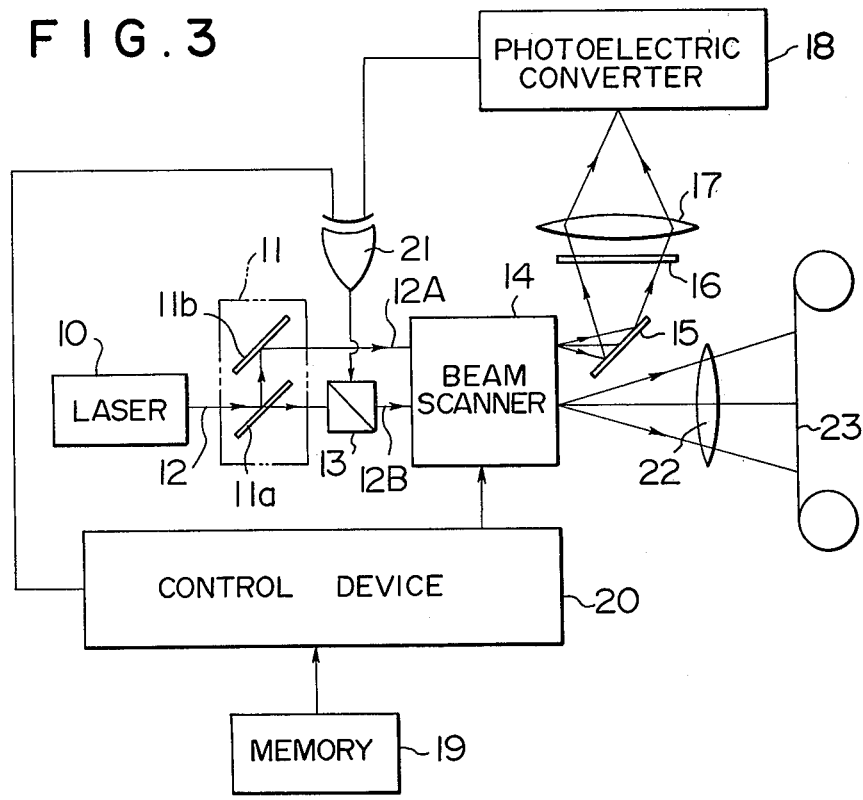

FIG.4A
F U J I
400
FIG.4B
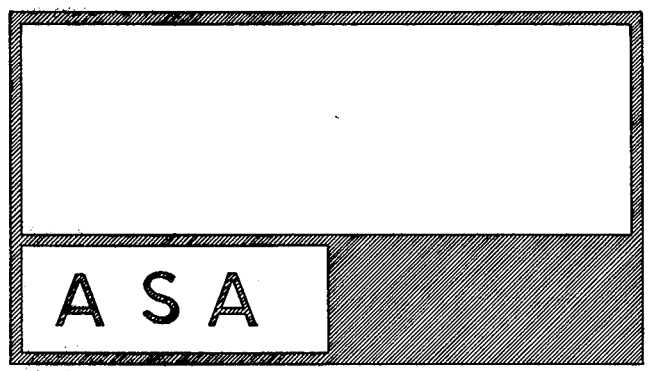
FIG.4C
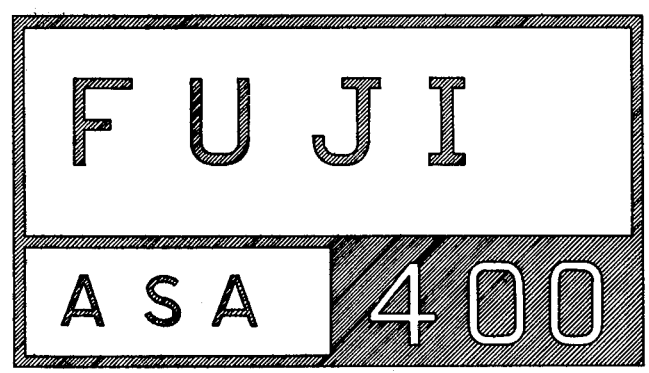

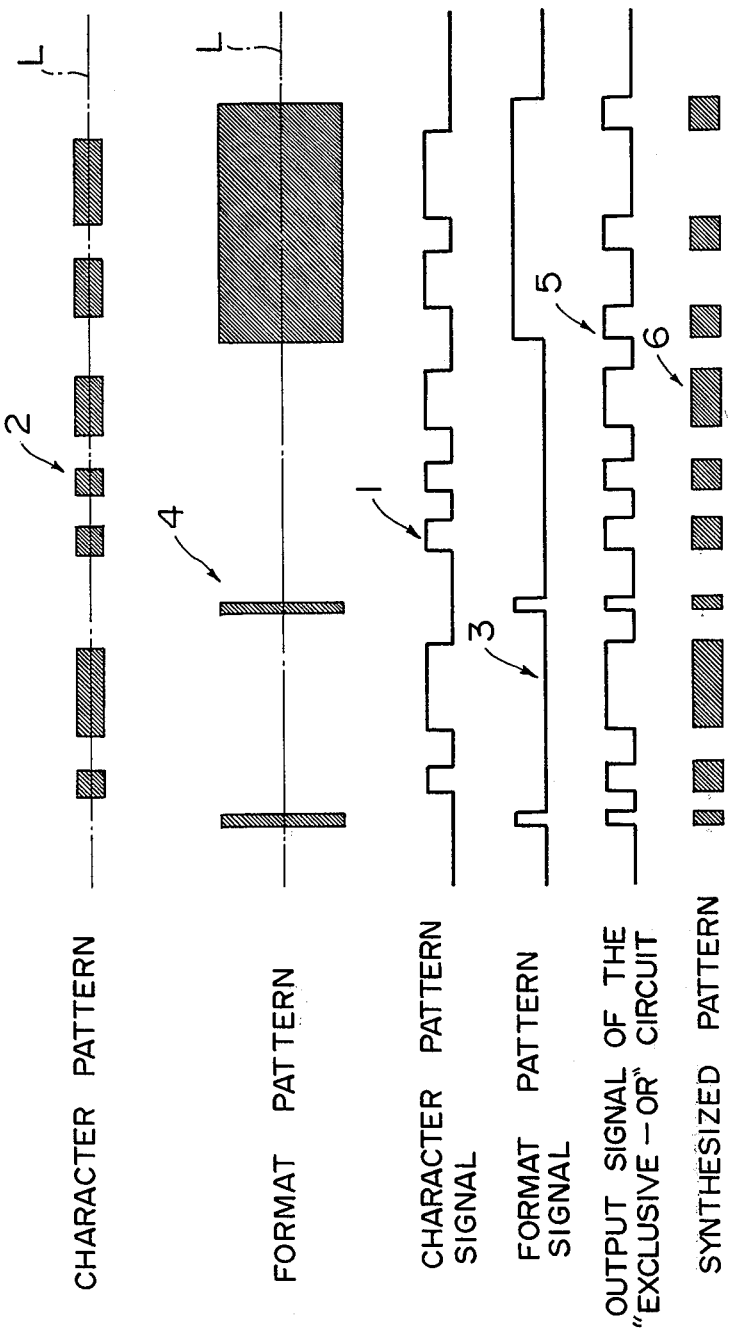

FORMAT-INFORMATION SYNTHESIZING SYSTEM

BACKGROUND OF THE INVENTION

1. Field of the Invention

This invention relates to a format-information synthesizing system suitable for use in a computer output recording system, and more particularly to a format-information synthesizing system which synthesizes a computer output information with a predetermined format for the output information optically carried by a format transparency to record the information on a recording medium together with the format.

2. Description of the Prior Art

There has been known a COM (Computer Output Microfilmer) system which is used as an output system in a computer for reading out information stored in a memory such as a magnetic recording tape and synthesizing the information with a format carried on a format transparency to record the information together with the format on a recording medium such as a photosensitive film or a heat sensitive film.

In the conventional COM system, the information to be recorded is optically synthesized with the format by means of a semi-transparent mirror. That is, in the conventional COM system, a laser beam emitted from a laser source passes through an on-off modulator and is deflected by a beam scanner to scan the surface of a recording medium. The on-off modulator and the beam scanner cooperate with each other to cause the laser beam to impinge upon selective areas of the recording medium so that the exposed areas form characters representing the information read out from the memory. The on-off modulator and the beam scanner are controlled by a control means which generates a character pattern signal corresponding to the read out information.

An image of the format carried on a format transparency is optically projected on the surface of the recording medium through a semi-transparent mirror which is located between the beam scanner and the recording medium, and recorded on the recording medium to be synthesized with said characters.

However, in the conventional COM system in which the information and the format are optically synthesized with each other, if the format transparency is displaced slightly from its normal position, the characters and the format may be adversely overlapped or superimposed with each other in part on the surface of the recording medium. If a character is superimposed with a black portion of the format, the character will become illegible.

The characters superimposed with the format can be made readable by reversing the black-and-white relation of both the superimposed portions of the format and the characters so that the portion of the character superimposed with the format appears as a white portion where other portions of the characters and the format appear black. However, in the above described conventional COM system, even though it may be possible to reverse the black-and-white relation of the character pattern, it is impossible to reverse the black-and-white relation of the format pattern.

SUMMARY OF THE INVENTION

In light of foregoing observations and description, the primary object of the present invention is to provide a format-information synthesizing system which is capable of reversing the black-and-white relation of the format pattern as well as that of the character pattern representing the information to be recorded together with the format.

Another object of the present invention is to provide a format-information synthesizing system in which, when the black characters to be recorded are adversely superimposed with a black portion of the format pattern, the superimposed portion of the character can be made readable as a white portion.

Still another object of the present invention is to provide a format-information synthesizing system in which some parts of the information can easily be recorded in white with a black background.

In accordance with this invention, the format pattern is converted into an electric signal and the electric signal representing the format pattern is inputted into an "exclusive-or" circuit together with a character pattern signal generated by a control device in accordance with the information read out from a memory. The output of the "exclusive-or" circuit, i.e. the exclusive-or output of the character pattern signal and the format pattern signal, is used to control an on-off modulator which modulates a laser beam so that the laser beam impinges upon selective areas of a heat sensitive or photosensitive recording medium to form a synthesized pattern.

In one embodiment of the present invention, said format pattern signal is generated by a format pattern generating means which comprises a laser source which emits a laser beam, a beam scanner which causes the laser beam to scan the format transparency, and a photoelectric converter which converts the intensity of the laser beam transmitting through the format transparency into an electric signal, namely the format pattern signal.

The format pattern signal and the character pattern signal can be of binary code. For example, a binary "unit" signal may represent a black portion or a portion where the film is to be exposed, while a binary "zero" signal represents a white portion or a portion where the film is not to be exposed.

As is well known, the output of an "exclusive-or" circuit becomes "1" only when one of the two input signals is "1" and the other is "0", and otherwise becomes "0".

Therefore, when the character pattern signal and the format pattern signal are both "1" (which means that the black portion of the format pattern and the black portion of the character pattern are to be recorded on the same area of the recording medium), the "exclusive-or" circuit outputs "0" to control the on-off modulator to cut off the laser beam, thereby causing the area of the recording medium to remain white or unexposed.

BRIEF DESCRIPTION OF THE DRAWINGS

FIGS. 1A and 1B respectively show examples of a format pattern and a character pattern, FIG. 1C shows a normal condition where the format pattern and the character pattern are synthesized without being overlapped with each other, FIG. 1D shows an undesirable condition where the format pattern and the character pattern are adversely overlapped with each other by a conventional format-information synthesizing system, FIG. 2 shows a corrected condition in which the overlapped portion of the character pattern and the format pattern is reversed in accordance with a format-information synthesizing system of this invention, FIG. 3 illustrates a format-information synthesizing system in accordance with an embodiment of the present invention, FIGS. 4A and 4B respectively show examples of a character pattern and a format pattern to be synthesized with each other by the format-information synthesizing system of this invention, FIG. 4C shows the condition when the character pattern and the format pattern are synthesized with each other using the format-information synthesizing system of this invention, and FIG. 5 illustrates an example of the relationship among the character pattern, the format pattern, the character pattern signal, the format pattern signal, the output signal of the "exclusive-or" circuit and the synthesized pattern which is to be finally recorded on the film.

DETAILED DESCRIPTION OF THE INVENTION

Now, it is assumed that the format pattern shown in FIG. 1A and the character pattern shown in FIG. 1B are intended to be synthesized as shown in FIG. 1C.

When the conventional synthesizing system in which the format and the information are optically synthesized by virtue of a semi-transparent mirror is used, the black portion of the format pattern and the black portion of the character pattern may adversely be overlapped or superimposed in part with each other as shown in FIG. 1D if the position of the format transparency is slightly displaced. When a part of the characters is superimposed with the black portion of the format as shown in FIG. 1D, the characters are illegible.

In accordance with this invention, the superimposed character can be made readable by reversing the black-and-white relation of both the superimposed portion of the character and that of the black portion of the format pattern as shown in FIG. 2.

Now, a preferred embodiment of the present invention will be described in detail hereinbelow referring to FIG. 3.

In FIG. 3, a format-information synthesizing system suitable for a COM system includes a laser source 10. A laser beam 12 emitted from the laser source 10 is divided into a first beam 12A and a second beam 12B by means of a beam splitter 11 which comprises a semi-transparent mirror 11a and a reflecting mirror 11b. The first beam 12A is used to scan a format transparency 16 to obtain a format pattern signal and the second beam 12B impinges upon a heat sensitive or photosensitive film (hereinafter referred to simply as "a film") 23 through a focusing lens 22 to record thereon a synthesized pattern of the format carried by the format transparency 16 and the information read out from a memory 19.

The first beam 12A is deflected by a two-dimensional beam scanner 14 which includes a rotating mirror (not shown) and is reflected by a mirror 15 to two-dimensionally scan the format transparency 16. The first beam 12A passing through the format transparency 16 is received by a photoelectric converter 18 through a condenser lens 17. The photoelectric converter 18 measures the intensity of the beam to output a binary "unit" signal when the intensity of the beam indicates that the beam has passed through a black portion of the format transparency 16 and to output a binary "zero" signal when the intensity of the beam indicates that the beam has passed through a white portion of the format transparency 16.

A control device 20 reads out the information stored in the memory 19 and generates a character pattern signal representing the read-out information.

Said second beam 12B passes through the beam scanner 14 by way of an on-off modulator 13 and scans the film 23 through the focusing lens 22. The second beam 12B is modulated by the on-off modulator 13 in accordance with a synthesized pattern signal.

Said output signal of the photoelectric converter 18, namely the format pattern signal, and the character pattern signal are inputted into an "exclusive-or" circuit 21 in synchronization with each other. The output of the "exclusive-or" circuit 21 is connected to said on-off modulator 13 to control it. The on-off modulator 13 turns on the second beam 12B when the output signal of the "exclusive-or" circuit 21 is "1", and turns off the same when the output signal of the "exclusive-or" circuit 21 is "0".

The second beam 12B emanates from the beam scanner 14 and impinges upon the surface of the film 23 through the focusing lens 22 and causes the film 23 to be exposed. The second beam 12B is deflected by the beam scanner 14 while emanating therefrom to scan the surface of the film 23 and photographically records the black portions of the patterns being controlled by the output signal of the "exclusive-or" circuit 21.

The control device 20 also controls the beam scanner 14 so that the photoelectric converter 18 generates the format pattern signal in synchronization with the character pattern signal and the characters are precisely recorded on the film 23 at the predetermined position in the format.

Said "exclusive-or" circuit 21 outputs a binary "1" signal only when one of the character pattern signal and the format pattern signal is "1" and otherwise outputs a binary "0" signal. Hence, when both of the character pattern signal and the format pattern signal are "1" which is the case that the character representing the read-out information is superimposed with a black portion of the format, the second beam 12B is cut off by the on-off modulator 13 so as not to expose the film 23 since the output of the "exclusive-or" circuit 21 is "0". Thus, the superimposed portion of the character can be automatically made visible as a white portion with a black background as shown in FIG. 2.

Further, if it is desired, some part of the information can easily be recorded in white with a black background by simply making black the area of the format pattern in which the characters are intended to be entered.

For example, when information shown FIG. 4A and a format shown in FIG. 4B are synthesized, the figure "400" is recorded in white with a black background as shown in FIG. 4C, since the character pattern signal corresponding to the figure "400" and the format pattern signal corresponding to the black area fed simultaneously to the "exclusive-or" circuit 21 are both "1", and therefore, the "exclusive-or" circuit 21 outputs binary "0" signals to record white characters "400" in the black background.

In the above example, if the character pattern signal is reversed, the black and white of the synthesized pattern shown in FIG. 4C is reversed and the figure "400" is recorded in black in a white background.

FIG. 5 illustrates an example of the relationship among the character pattern, the format pattern, the character pattern signal, the format pattern signal, the output signal of the "exclusive-or" circuit 21 and the synthesized pattern which is to be finally recorded on the film 23.

In FIG. 5, the character pattern signal 1 represents an arrangement of black and white portions along line L of a character pattern 2. The format pattern signal 3 represents an arrangement of black and white portions along line L of a format pattern 4. When the character pattern signal 1 and the format pattern signal 3 are inputted to the "exclusive-or" circuit 21, the "exclusive-or" circuit 21 outputs a signal as indicated at 5 to control the on-off modulator 13 to modulate the second beam 12B to impinge upon selective areas of the film 23 in a pattern indicated at 6.

In the above described embodiment, the first beam 12A and the second beam 12B are deflected by the same beam scanner 14. However, both the beams 12A and 12B may be deflected by a pair of beam scanners arranged to be operated in synchronization with each other. Further, the beams 12A and 12B can be emitted from two independent laser sources.

We claim:

1. A format-information synthesizing system comprising a character pattern signal generating means which generates a character pattern signal in accordance with the information to be recorded, a format pattern signal generating means which generates a format pattern signal by converting a format optically recorded on a format transparency into an electric signal, an "exclusive-or" circuit which receives the character pattern signal and the format pattern signal which are inputted thereinto in synchronization with each other, a laser source, an on-off modulator which modulates a laser beam emitted from the laser source in accordance with the output of the "exclusive-or" circuit, and a beam scanner which deflects the modulated laser beam to scan the surface of a recording medium to record the synthesized pattern of the information and the format on the recording medium.

2. A format-information synthesizing system as defined in claim 1 wherein said format pattern signal generating means comprises a laser source, a beam scanner for deflecting a laser beam emitted from the laser to scan the format transparency, and a photoelectric converter which converts intensity of the laser beam transmitting through the format transparency into an electric signal.

* * * * *